(12) United States Patent
Hayavadana et al.

(10) Patent No.: US 10,567,490 B2
(45) Date of Patent: Feb. 18, 2020

(54) DYNAMICALLY REALLOCATING RESOURCES FOR OPTIMIZED JOB PERFORMANCE IN DISTRIBUTED HETEROGENEOUS COMPUTER SYSTEM

(71) Applicant: SAMSUNG ELECTRONICS CO., LTD., Suwon-si, Gyeonggi-do (KR)

(72) Inventors: Sameera Bharadwaja Hayavadana, Bangalore (IN); Gaurav Kumar, Bangalore (IN); Rajaneesh Tiwari, Bangalore (IN)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 144 days.

(21) Appl. No.: 15/261,181

(22) Filed: Sep. 9, 2016

(65) Prior Publication Data

US 2017/0078373 A1 Mar. 16, 2017

(30) Foreign Application Priority Data

Sep. 11, 2015 (IN) .......................... 4845/CHE/2015

(51) Int. Cl.
*H04L 29/08* (2006.01)
*H04L 12/26* (2006.01)

(52) U.S. Cl.
CPC .......... *H04L 67/1002* (2013.01); *H04L 43/08* (2013.01)

(58) Field of Classification Search
CPC ............. H04L 67/1002; H04L 41/0896; H04L 41/145; H04L 43/08
See application file for complete search history.

(56) References Cited

U.S. PATENT DOCUMENTS

| | | | | |
|---|---|---|---|---|
| 2003/0187970 A1* | 10/2003 | Chase | ................. | G06Q 10/06 709/223 |
| 2011/0246267 A1* | 10/2011 | Williams | ............... | G06Q 30/02 705/14.4 |
| 2012/0066684 A1* | 3/2012 | Takami | ................. | G06F 9/5083 718/102 |
| 2012/0089664 A1* | 4/2012 | Igelka | ................... | G06F 9/5083 709/203 |
| 2012/0303406 A1* | 11/2012 | Srinivas | ................. | G06Q 10/06 705/7.22 |
| 2012/0303413 A1* | 11/2012 | Wang | ................. | G06Q 10/0631 705/7.31 |

(Continued)

*Primary Examiner* — Uzma Alam
(74) *Attorney, Agent, or Firm* — F. Chau & Associates, LLC

(57) ABSTRACT

An apparatus dynamically reallocates resources for optimized job performance in a distributed heterogeneous computer system that includes a plurality of computer nodes. The apparatus includes an application injector to invoke at least one job to be performed on at least one computer node among the computer nodes. The apparatus further includes a collector to dynamically collect a workload value on each computer node. The apparatus further includes a job informer to determine known and unknown jobs on each computer node. The apparatus further includes a job optimizer to determine a data distribution vector based on the workload value and the known and unknown jobs on each computer node. The data distribution vector defines an amount of data to be distributed among the computer nodes to perform the at least one job.

7 Claims, 14 Drawing Sheets

(56) References Cited

U.S. PATENT DOCUMENTS

| | | | |
|---|---|---|---|
| 2014/0115592 A1* | 4/2014 | Frean | G06F 9/5027 |
| | | | 718/102 |
| 2014/0222238 A1* | 8/2014 | Friedrich | G05B 13/02 |
| | | | 700/296 |
| 2015/0026336 A1* | 1/2015 | Suchter | G06F 9/5038 |
| | | | 709/224 |
| 2015/0134280 A1* | 5/2015 | Narayan | G06Q 10/04 |
| | | | 702/62 |
| 2015/0192945 A1* | 7/2015 | Narayan | G06Q 10/04 |
| | | | 700/291 |
| 2015/0277980 A1* | 10/2015 | Ovsiankin | G06F 9/5066 |
| | | | 718/104 |
| 2015/0363226 A1* | 12/2015 | Frean | G06F 9/5027 |
| | | | 718/103 |

* cited by examiner

FIG. 10

| Task ID | Complexity | Optimization Model Specific Extra Parameters |
|---------|------------|---------------------------------------------|
| 1 | $1 = O(n)$ | Data Access Behaviors, Computing Node Preferences |

DYNAMICALLY REALLOCATING RESOURCES FOR OPTIMIZED JOB PERFORMANCE IN DISTRIBUTED HETEROGENEOUS COMPUTER SYSTEM

CROSS-REFERENCE TO RELATED APPLICATIONS

The present application claims priority under 35 U.S.C. § 119 to Indian Patent Provisional Application No. 4845/CHE/2015 filed on Sep. 11, 2015, in Indian Patent Office, the entire contents of which are incorporated herein by reference.

TECHNICAL FIELD

The present disclosure relates to heterogeneous computer systems, and more particularly, relates to a method and a distributed heterogeneous computer system with a plurality of computer nodes for dynamically reallocating resources for optimized job performance.

DESCRIPTION OF THE RELATED ART

Advancement in various fields such as manufacturing, advertisement, health-care, finance or the like is related to visioning automated system with minimal human involvement. The three major pillars for such a system are sense, process, and react. To tackle sensing, newer equipments are equipped with a huge number of sensors. Further, these sensors are continuously generating enormous amount of data. Therefore, huge processing clusters required to process such huge amount of the data will be in demand. The result of such processing can be translated to automated actions to completely realize the vision of the automated system.

One related approach of setting up a processing cluster aims to maximize the performance and does not necessarily take care of heat, energy, and other reliability factors. This increases the setup and runtime cost of the processing clusters as counteracting systems, like coolers, need to be installed to reduce the heat. Moreover, the applications developed to run on those clusters are specifically designed for that system and thus include hardware specific optimization. So any update in the hardware of the existing system requires a corresponding update in applications to include optimizations. Application developer and system architects may not have expertise to perform appropriate optimization for the system concerned. Also, the application developer may not have knowledge of other applications competing on the system. This makes the application update task a complex one in terms of time and also the optimization task performed may not be accurate.

Other approaches include many computing/computer node search of which may have their own dedicated task schedulers. The task schedulers are usually implemented to maximize the performance. However, the task schedulers may or may not consider energy optimization. Even if the task schedulers consider the energy optimization, due to limited visibility of all computing nodes at a given task scheduler's level, achieving a global energy optimization point for the system is not possible. So applications depending on the task schedulers for energy optimization may not achieve global optimum and hence may cause unobserved and uncontrolled wastage of energy.

Further, while applications are written for maximized performance, they do not really consider on which computing nodes the application is running. For example, out of many computing nodes, only a few among them are being used extensively, resulting in over-heating and damaging the computing nodes. Such systems require continuous maintenance, which results in huge maintenance costs.

SUMMARY

Accordingly, the example embodiments may provide a distributed heterogeneous computer system. The distributed heterogeneous computer system may include a plurality of computer nodes, each operatively connected through a network interface to a network to provide data communication between the computer nodes, wherein each of the computer nodes may include at least one job to be performed. Further, the distributed heterogeneous computer system may include an application injector at the at least one computer node among the plurality of computer nodes, for invoking the at least one job to be performed. Further, the distributed heterogeneous computer system may include a collector at the at least one computer node for dynamically collecting a workload value on each of the computer nodes. Further, the distributed heterogeneous computer system may include a job informer at the at least one computer node for determining known and unknown jobs on each of the computer nodes. Further, the distributed heterogeneous computer system may include a job optimizer at the at least one computer node for determining a data distribution vector based on the workload value; and the known and unknown jobs on each of the computer nodes, wherein the data distribution vector may define an amount of data to be distributed among the plurality of nodes to perform the at least one job.

In addition, the example embodiments may provide an apparatus for dynamically reallocating resources for optimized job performance in a distributed heterogeneous computer system comprising a plurality of computer nodes. The apparatus may include an application injector configured to invoke at least one job to be performed on at least one computer node among the plurality of computer nodes. Further, the apparatus may include a collector configured to dynamically collect a workload value on each of the computer nodes. Further, the apparatus may include a job informer configured to determine known and unknown jobs on each of the computer nodes. Further, the apparatus may include a job optimizer configured to determine a data distribution vector based on the workload value and the known and unknown jobs on each of the computer nodes, wherein the data distribution vector may define an amount of data to be distributed among the plurality of nodes to perform the at least one job.

Moreover, the example embodiments may provide a method for dynamically reallocating resources for optimized job performance in a distributed heterogeneous computer system. The method may include invoking, by an artificial injector, at least one job to be performed on at least one computer node among the plurality of computer nodes. Further, the method may include dynamically collecting, by a collector, a workload value on each of the computer nodes. Further, the method may include determining, by a job informer, known and unknown jobs on each of the computer nodes. Further, the method may include determining, by a job optimizer, a data distribution vector based on the workload value and the known and unknown jobs on each of the computer nodes, wherein the data distribution vector may define an amount of data to be distributed among the plurality of nodes to perform the at least one job.

In some example embodiments, the workload value may be a function of at least one of performance metric, reliability metric, extra factors, and data distribution ratio.

In some example embodiments, the data distribution vector may be stored in a lookup table.

In some example embodiments, the method may further include feeding back the lookup table entries that includes a difference between an expected time and an actual time of running the at least one job.

In some example embodiments, the at least one job performance on each of the computer node of the system may be periodically optimized by a refresher at the computer node system.

In some example embodiments, the refresher may use a difference between an expected time and an actual time of running the at least one job to dynamically determine a time period for optimizing the at least one job performance on each of the computer nodes of the system.

In some example embodiments, the distribution vector may be determined using at least one of a linear optimization model and a non-linear optimization model.

These and other aspects of the example embodiments will be better understood when considered in conjunction with the following description and the accompanying drawings. It should be understood, however, that the following description, while indicating some example embodiments and numerous specific details thereof, are given by way of illustration and not of limitation. Many changes and modifications may be made within the scope of the example embodiments without departing from the technical spirit thereof, and the example embodiments may include all such modifications.

BRIEF DESCRIPTION OF THE DRAWINGS

The above and other aspects, features, and advantages of certain example embodiments of the present disclosure will be more apparent from the following description with reference to the drawings.

FIG. 10 illustrates a job informer/task information store for maintaining an information store for different tasks being run on the distributed heterogeneous system, according to some example embodiments.

DETAILED DESCRIPTION OF EXAMPLE EMBODIMENTS

Figure 1:
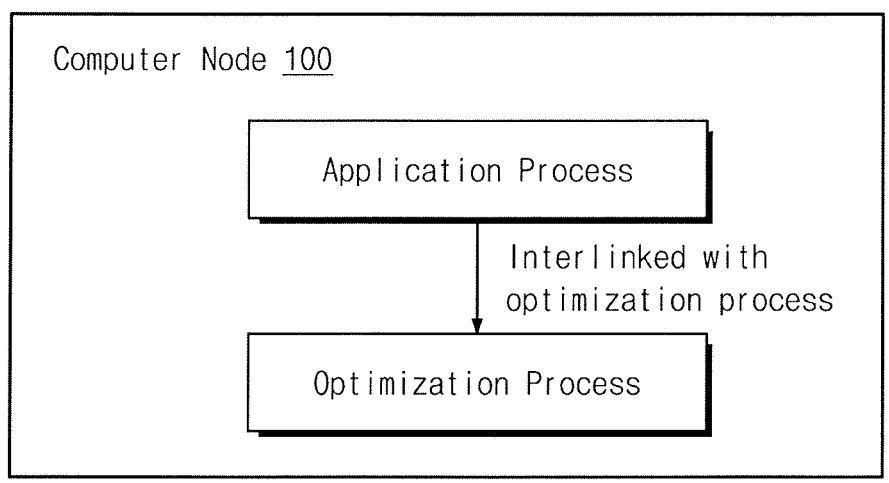
FIG. 1 illustrates a block diagram of a computer node in which an application process is interlinked with an optimization process in some related fields.

Various example embodiments of the present disclosure will now be described in detail with reference to the accompanying drawings. In the following description, specific details such as detailed configuration and components are merely provided to facilitate the overall understanding of these example embodiments of the present disclosure. Therefore, it should be apparent to those skilled in the art that various changes and modifications of the example embodiments described herein may be made without departing from the scope and technical spirit of the present disclosure. In addition, descriptions of well-known functions and configurations will be omitted for clarity and brevity.

Also, the various example embodiments described herein are not necessarily mutually exclusive, thus some example embodiments may be combined with one or more other example embodiments to form new example embodiments. Herein, the term "or" as used herein, refers to a non-exclusive or, unless otherwise indicated. The examples used herein are intended merely to facilitate an understanding of ways in which the example embodiments may be practiced and to further enable those skilled in the art to practice the example embodiments. Accordingly, the examples should not be construed as limiting the scope of the example embodiments.

As being traditional in the field of the present disclosure, the example embodiments may be described and illustrated in terms of blocks which carry out a described function or functions. These blocks, which may be referred to herein as units or modules or the like, are physically implemented by analog or digital circuits such as logic gate(s), integrated circuit(s), microprocessor(s), microcontroller(s), memory circuit(s), passive electronic component(s), active electronic component(s), optical component(s), hardwired circuit(s) and the like, and may optionally be driven by firmware or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the example embodiments may be physically separated into two or more interacting and discrete blocks without departing from the scope of the present disclosure. Likewise, the blocks of the example embodiments may be physically combined into more complex blocks without departing from the scope of the present disclosure.

Accordingly, the example embodiments may provide an apparatus for dynamically reallocating resources for optimized job performance in a distributed heterogeneous computer system including a plurality of computer nodes. The apparatus may include an application injector configured to invoke at least one job to be performed on at least one computer node among the plurality of computer nodes. Further, the apparatus may include a collector configured to dynamically collect a workload value on each of the computer nodes. Further, the apparatus may include a job informer configured to determine known and unknown jobs on each of the computer nodes. Further, the apparatus may include a job optimizer configured to determine a data distribution vector based on the workload value and the known and unknown jobs on each of the computer nodes, wherein the data distribution vector may define an amount of data to be distributed among the plurality of nodes to perform the at least one job.

Unlike conventional systems and methods, the proposed method and system may decouple application process and optimization process, thus enabling usage of more complex non-linear optimization techniques to achieve global optimization of the computer nodes. Further, the proposed method and system may be scaled horizontally as well as vertically. This may enable their usage to wide variety of the computer nodes ranging from an embedded device to a complete hierarchical computer cluster.

Unlike conventional systems and methods, the proposed system and method may decouple the application development and the optimization process. Thus, it may be possible to free the application developers from the task of optimization, which results in a quick update. As the optimization task is performed independently and having complete visibility of all computer nodes (e.g., 100a to 100n in FIG. 3), global optimization value may be reached, thus ensuring better cost saving and enhancing the reliability of the individual computer nodes.

Referring now to the drawings, and more particularly to FIGS. 1 through 15, where similar reference characters denote corresponding features consistently throughout the figures, these are shown in some example embodiments.

FIG. 1 illustrates a block diagram of a computer node 100 in which an application process is interlinked with an optimization process in some related fields. In conventional methods, a developer has to write an optimization process and a data distribution technique (e.g., OpenVX). Data distribution may be performed with the conventional methods, where the optimization process is attached with a process where the application process is also running. Therefore, complex optimization techniques may not run and they had to suffice with sub-optimal distribution vector. Further, the conventional methods have less visibility of the computer node 100 and other active tasks. Further, the conventional methods are not scalable in multi-computer cluster environment (for example, Hadoop clusters), and may not handle some types of tasks such as input/output (I/O) intensive task, random memory access, or the like.

The industry 4.0 has envisioned smarter and more automated equipment. As a result, huge sensory data getting generated by current equipment requires huge data processing in a real-time in order to ensure its utilization in automated decision making and action execution mechanism. Thus, requirement for huge data centers will grow in corning years, especially in manufacturing sector. Setting up a new data center faces many problems along with the one mentioned above. But it is believed that the problems such as energy optimization, improved reliability, and continuous performance updates have huge impact over the total running cost for the data centers and hence the manufacturing fabrication. Even if manufacturers manage to save $1 per equipment per day, it may result in saving millions of dollars for the manufacturing fabrication in a complete year. Given that, apart from fabrication set-up cost, maintenance of the fabrication and penalty due to its downtime is very high.

Figure 2:
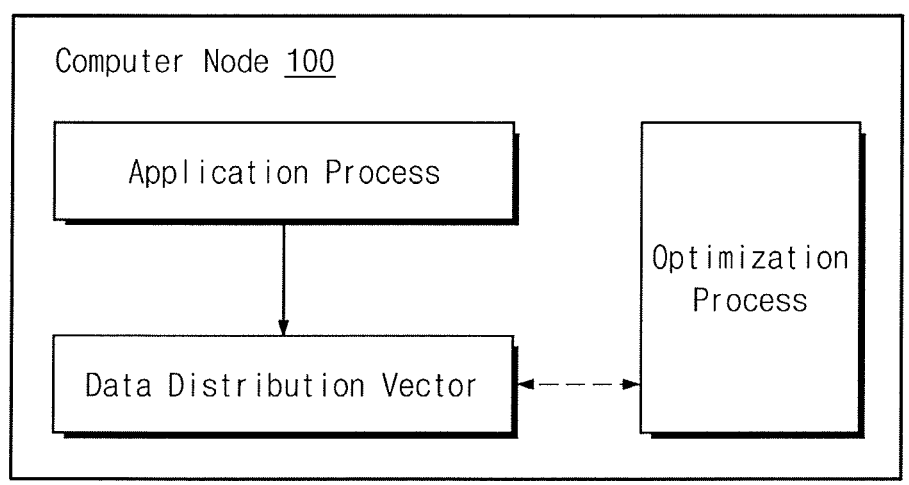
FIG. 2 illustrates a block diagram of a computer node in which an application process and an optimization process is decoupled, according to some example embodiments.

FIG. 2 illustrates a block diagram of a computer node 100 in which an application process and an optimization process is decoupled, according to some example embodiments. As shown in the FIG. 2, the application process and the distribution techniques are decoupled. Therefore, an application developer or an application process developer may not have to concern with a data distribution vector. An application associated with the application process may just query the data distribution vector for tasks. However, the data distribution may be performed separately, and complex non-linear optimizations techniques may be used to allow the system to get stabilize.

As the application process and the data distribution techniques are separated, they may have more visibility of all other active tasks as well as all other computer nodes. Unlike conventional systems and methods employing the computer node 100 of FIG. 1, the proposed method employing the computer node 100 of FIG. 2 may be easy to scale up in the multi-computer cluster environment, and may handle all kinds of tasks including I/O intensive task, random memory access, or the like.

Unlike the conventional systems and methods, the proposed system may distribute the tasks generated from the application layers on a global scale among the computer node 100, which results in greater reliability, without affecting the required minimum performance and also minimizing cost involved in distribution of the tasks.

In the conventional systems and methods, a static linkage between application development (i.e., technology) and the optimization process may be provided. Application developers may also be involved with optimizations. In some other conventional systems and methods, some designs are proposed such as an enhanced compiler for heterogeneous computing. In this kind of designs, any application developed over that, the compiler uses same process for optimization, but they are very specific to Open Computing Language (OpenCL) framework. Similarly, other designs are proposed such as a design framework for the heterogeneous computing. In this kind of design framework, any application that is not adhering to that design framework may not get benefit from the optimization.

The drawback of these conventional systems and methods are based on the static linkage between the application development and the optimization process component. This drawback limits the usage of the conventional systems and methods. However, the developers do not have the system level visibility (different applications being run on the system along with their application) as such; therefore the optimization becomes specific to the application. However, in the proposed system and method, the application process and the optimization process may be decoupled with each other. Further, the developers may have the complete system level visibility. Thus, the application developer may not have to concern with a data distribution vector.

Figure 3:
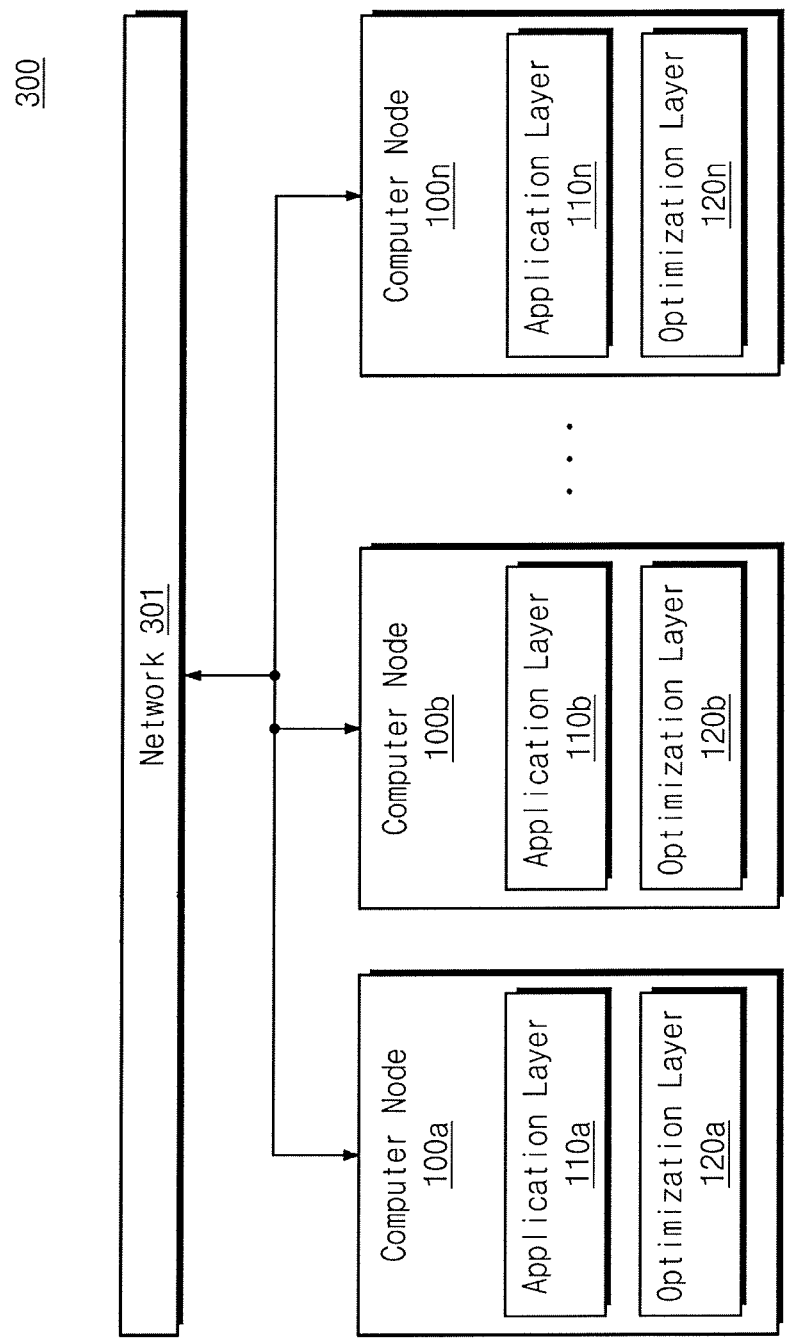
FIG. 3 illustrates a distributed heterogeneous computer system with a plurality of computer nodes for dynamically reallocating resources for optimized job performance, according to some example embodiments.

FIG. 3 illustrates a distributed heterogeneous computer system 300 with a plurality of computer nodes 100a to 100n (which may also be referred to as computer node(s) 100 herein) for dynamically reallocating resources for optimized job performance, according to some example embodiments. In some example embodiments, the distributed heterogeneous computer system 300 may include the plurality of computer nodes 100a to 100n, wherein each of the computer nodes 100 may be operatively connected through a network interface to a network 301 to provide data communication between the computer nodes 100, for example, to provide the data communication between the computer node 100a and the computer node 100b.

Each of the computer nodes 100 may include an application layer 110 (e.g., 110a, 110b and 110n) and an optimization layer 120 (e.g., 120a, 120b and 120n). The application layer 110 (or application process) may query the data distribution vector for a plurality of tasks. The optimization layer 120 may take care of the data distribution separately. The detailed functionalities of the application layer 110 and the optimization layer 120 will be explained in conjunction with FIG. 4.

Figure 4:
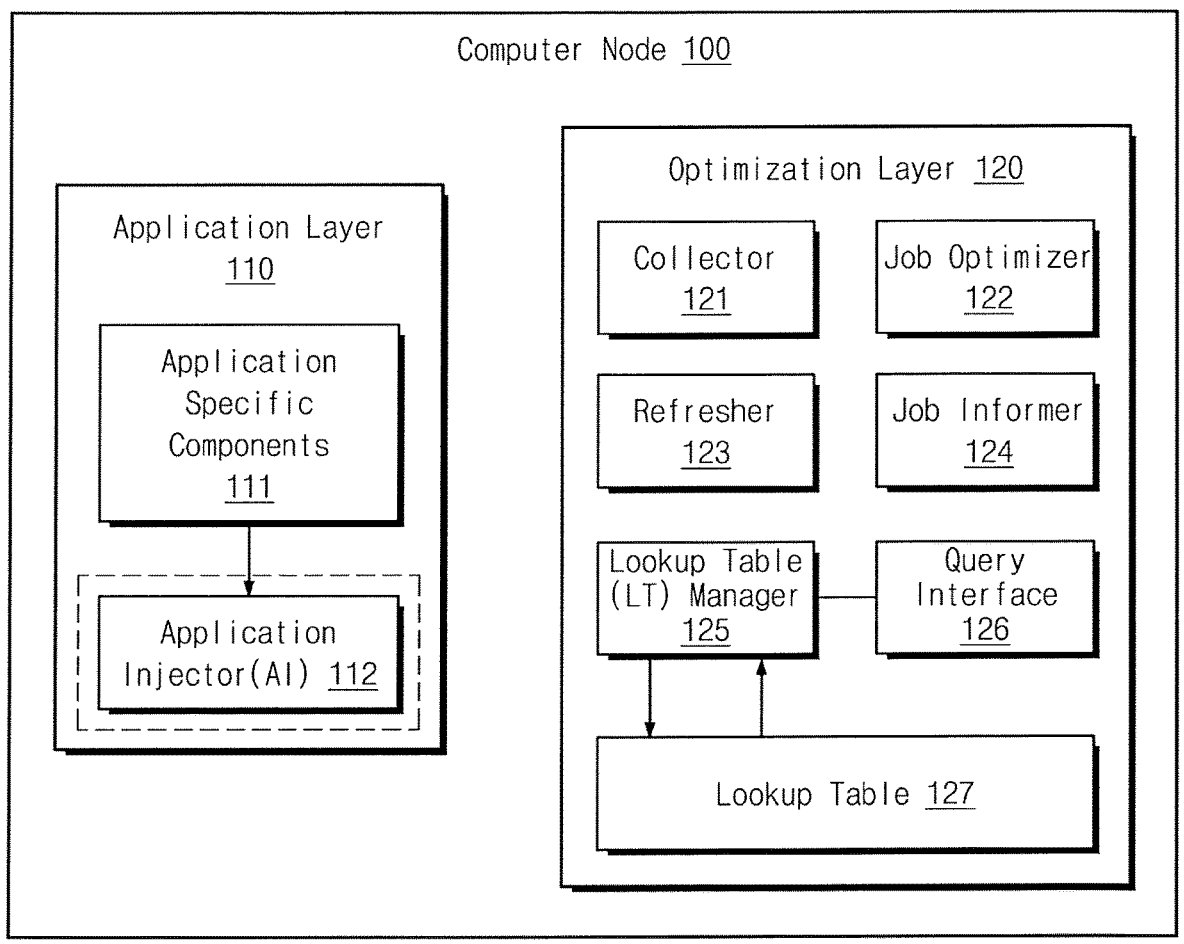
FIG. 4 illustrates a block diagram of a computer node in which an application layer and an optimization layer is decoupled to achieve global optimization, according to some example embodiments.

FIG. 4 illustrates a block diagram of the computer node 100 in which the application layer 110 and the optimization layer 120 is decoupled to achieve global optimization, according to some example embodiments. In some example embodiments, the computer node 100 may include the application layer 110 and the optimization layer 120. The application layer 110 may include application specific components 111 and an application injector (AI) 112. The optimization layer 120 may include a collector 121, a job optimizer 122, a refresher 123, a job informer 124, a lookup table (LT) manager 125, a query interface 126, and a LT 127.

The applications specific components 111 may be configured to share a task type and data load to the AI 112. In some example embodiments, the AI 112 may be configured to invoke at least one job to be performed on the computer node(s) 100. In some examples, the AI 112 may be a very light weight component which acts as a connector between the application specific components 111 and the optimization layer 120.

After receiving the task type and the data load, the AI 112 may be configured to query the optimization layer 120 to get a data distribution vector. Depending on the data distribution vector, the task may then be scheduled between different computer nodes 100 with data loads in the distribution vector. However, the overhead incurred by the AI 112 may be negligible as the AI 112 runs in O(1) time.

The components of the optimization layer 120 are described below:

The collector 121 may be configured to dynamically collect a workload value on each of the computer nodes 100. In some examples, the collector 121 may basically deal with a task of collecting parameters of a distributed heterogeneous computer system 300 in FIG. 3 (e.g., performance related parameters, reliability related parameters, energy related parameters, or the like) per node. Further, the parameters of the distributed heterogeneous computer system 300 may be sub-classified into two categories such as static ones and dynamic ones. The detailed description of the static and dynamic categories will be explained in conjunction with FIG. 8. Further, the collector 121 may basically define an abstraction layer which may be extended for a specific computer node 100 and in some specific use-case scenarios.

The refresher 123 may be configured to trigger an activation of the optimization layer 120. Further, the refresher 123 may be configured to trigger the collector 121 to update the parameters of the distributed heterogeneous computer system 300. The job optimizer 122 may be configured to optimize the tasks based on the collected parameters for the entire tasks listed in the job informer 124 (or task information store). In some examples, the activation may be periodic or non-periodic, external trigger signal based depending on the use-case scenarios.

The job informer 124 may be configured to determine known and unknown jobs on each of the computer nodes 100. Further, the job informer 124 may be configured to store and maintain a knowledge-base for the tasks running on the distributed heterogeneous computer system 300. In some examples, the knowledge-base may be created manually before setting up the distributed heterogeneous computer system 300. In some other examples, the knowledge-base may be automatically created over a period of time. Further, the job informer 124 may be configured to store information associated with the tasks such as time complexity, nature (e.g., memory intensive, processor intensive, or I/O intensive), type (e.g., critical or normal), expected time of completion, or the like. Each task listed in the job informer 124 may be given a unique task identifier.

Further, the job optimizer 122 may be configured to determine a data distribution vector based on the workload value and the known and unknown jobs on each of the computer nodes 100. The data distribution vector may define an amount of data to be distributed among the different computer nodes 100 to perform the at least one job. In some example embodiments, the workload value may be a function of performance metric, reliability metric, extra factors, a data distribution ratio, and any combination thereof.

In some examples, the job optimizer 122 may optimize the jobs/tasks based on a mathematical model specifically designed for optimizing task execution time and energy consumed. The mathematical model selected may be linear, non-linear, probabilistic, or any combination thereof (e.g., a hybrid model) depending upon the use-case scenario for the distributed heterogeneous computer system 300. Further, the job optimizer 122 may receive the parameters collected from the collector 121 and the information stored in the job informer 124 as an input. Further, the job optimizer 122 may execute the optimization techniques such as a simple method, an Interior-point method, and a gradient descent/ascent method as applicable on a cost-function model. The result obtained may be the data distribution vector for each of the task listed in the job informer 124. Further, the data distribution vector may be cached and saved in the LT 127.

Each row entry of the LT 127 may correspond to the unique task identifier maintained in the job informer 124, and corresponding floating entries may define the data distribution vector. The sum of floating entries in each row is equal to 1.0. Higher floating value for the computer node 100 for the task may mean that the given computer node 100 is more suitable to handle higher data for that task at that time. Expected completion-time entry may be theoretical value for the tasks, in units per data size. Any task for a given data size may be expected to complete within that time for that data size. The LT 127 may be configured to maintain the variance between actual running times and the theoretical estimated times. The variance corresponding to the maximum value may be reported by any application running that task. The table-1 below shows a sample lookup table.

TABLE 1

| Task ID | Computer node 100a | Computer node 100b | Computer node 100c | Computer node 100d | Computer node 100n | Expected completion time (unit/data) | Variance (unit/data) |
|---|---|---|---|---|---|---|---|
| 1 | 0.2 | 0.1 | 0.3 | 0.3 | 0.1 | 1.2 | 0.02 |
| 2 | 0.1 | 0.2 | 0 | 0.4 | 0.3 | 3.1 | 0.1 |
| 3 | 0 | 0 | 0 | 0 | 1 | 2.5 | 0.005 |

In some example embodiments, the apparatus/computer node 100 may include the lookup table manager 125 at the at least one computer node 100 for storing the data distribution vector in the LT 127, where the LT manager 125 may be configured to maintain the LT 127 and to provide a query interfere 126 to the AI 112 for retrieving the data distribution vector. The LT manager 125 may define a hashing technique for fast indexing and retrieving contents of the LT 127. The LT manager 125 may also provide an interface where the AI 112 queries and retrieves the data distribution vector for the tasks run by the AI 112. The functionality of the AI 112 may be intended to fetch the data distribution vector for any particular task identifier from the LT 127. The time complexity involved is O(1).

Unlike conventional systems and methods, the proposed optimization process may work independently of the AI 112. The AI 112 may be designed using any technology which communicates with the optimization layer 120. The communication technique may be a socket based, an inter process communication to an inter task communication. This may make the optimization layer 120 separate from the AI 112. Thus, even the application built using any language may utilize the benefit of the optimization layer 120. This may abstract the application developer from the task optimization. Instead, they may concentrate more on application development, which results in reduction in overall developing time.

Figure 5:
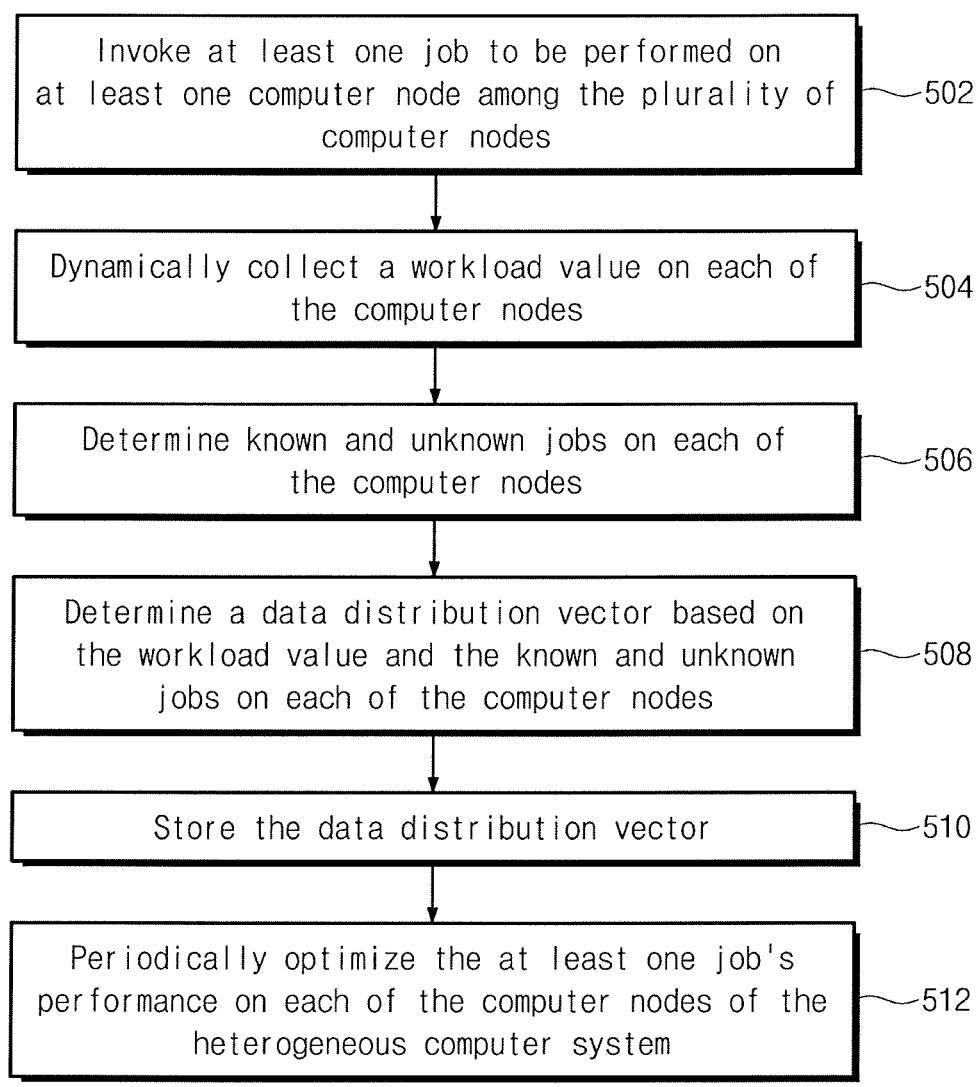
FIG. 5 is a flow diagram illustrating a method for dynamically reallocating resources for an optimized job performance in a distributed heterogeneous computer system, according to some example embodiments.

FIG. 5 is a flow diagram 500 illustrating a method for dynamically reallocating resources for the optimized job performance in the distributed heterogeneous computer system 300, according to some example embodiments. In operation 502, the method may include invoking at least one job to be performed on the computer node 100. In some example embodiments, the method may allow the AI 112 to invoke the at least one job to be performed on the computer node 100. In some examples, the at least one job to be performed on the computer node 100a among the plurality of computer nodes 100a to 100n may be invoked. In some other examples, the at least one job to be performed on the computer node 100b among the plurality of computer nodes 100a to 100n may be invoked.

In operation 504, the method may include dynamically collecting the workload value on each of the computer nodes 100. The method may allow the collector 121 to dynamically collect the workload value on each of the computer nodes 100. In operation 506, the method may include determining the known and unknown jobs on each of the computer nodes 100. The method may allow the job informer 124 to determine the known and unknown jobs on each of the computer nodes 100.

In operation 508, the method may include determining the data distribution vector based on the workload value and the known and unknown jobs on each of the computer nodes 100. The method may allow the job optimizer 122 to determine the data distribution vector based on the workload value and the known and unknown jobs on each of the computer nodes 100. In some example embodiments, the data distribution vector may define the amount of data to be distributed among the plurality of computer nodes 100a to 100n to perform the at least one job.

In operation 510, the method may include storing the data distribution vector. The method may allow the LT 127 to store the data distribution vector. In operation 512, the method may include periodically managing (e.g., optimizing) performance of the at least one job on each of the computer nodes 100 of the distributed heterogeneous computer system 300. The method may allow the refresher 123 to periodically manage (e.g., optimize) the at least one job performance on each of the computer nodes 100 of the distributed heterogeneous computer system 300.

The various actions, acts, blocks, steps, or the like in the method and the flow diagram 500 may be performed in the order presented, in a different order or simultaneously. Further, in some example embodiments, some of the actions, acts, blocks, steps, or the like may be omitted, added, modified, or skipped, without departing from the scope of the present disclosure.

Figure 6:
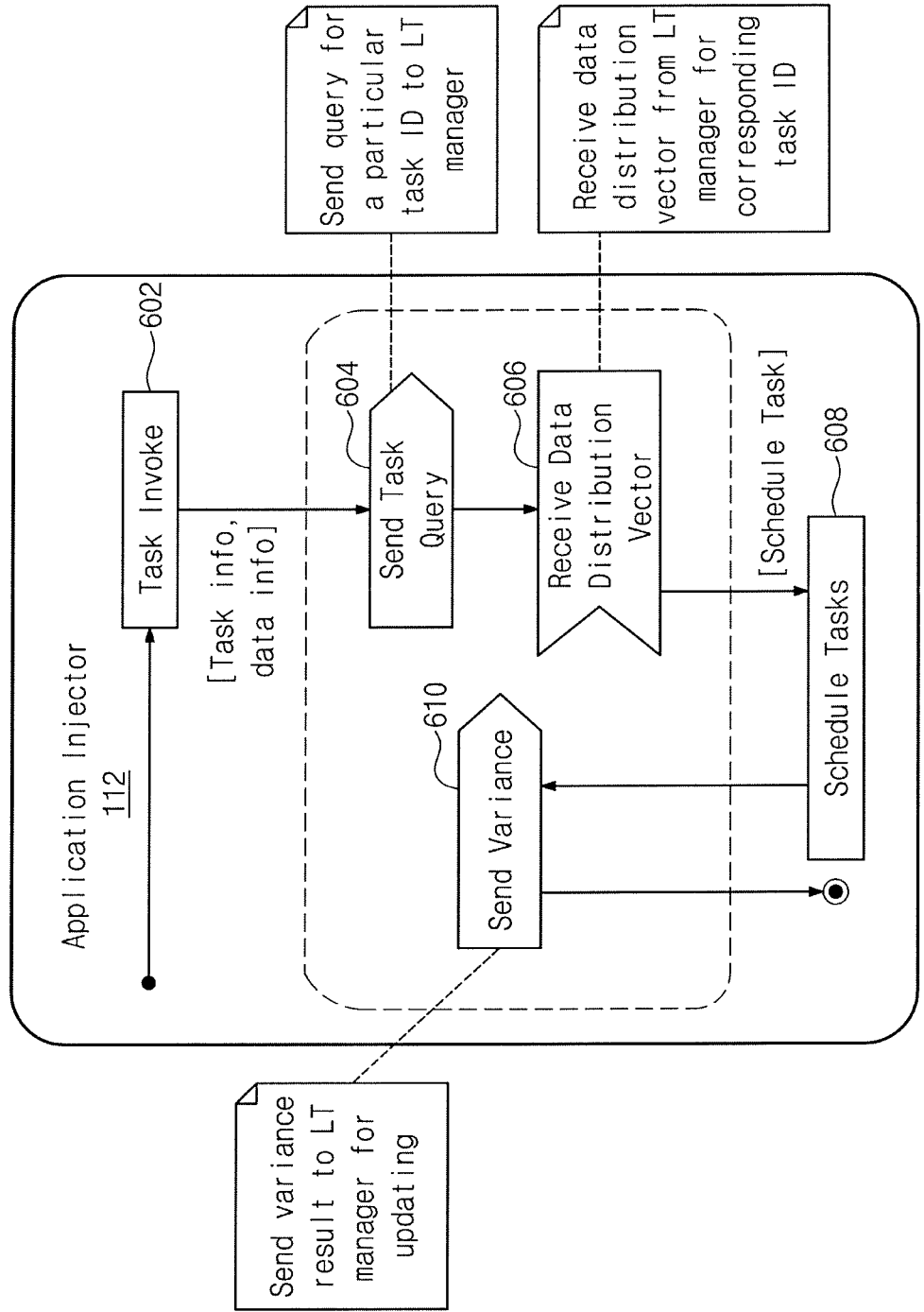
FIG. 6 is a conceptual diagram illustrating various operations of an application injector for invoking jobs between different computer nodes, according to some example embodiments.

FIG. 6 is a conceptual diagram 600 illustrating various operations of the AI 112 for invoking jobs between different computer nodes 100, according to some example embodiments.

In operation 602, the method may include invoking the task with the task information and the data information. The method may allow the AI 112 to invoke the task with the task information and the data information. In operation 604, the method may include querying the LT manager 125 for the data distribution vector for the particular task identifier. The method may allow the AI 112 to query the LT manager 125 for the data distribution vector for the particular task identifier.

In operation 606, the method may include receiving the data distribution vector from the LT manager 125 for the corresponding task identifier. The method may allow the AI 112 to receive the data distribution vector from the LT manager 125 for the corresponding task identifier. In operation 608, the method may include scheduling the task as per the data distribution vector. The method may allow the AI 112 to schedule the task as per the data distribution vector.

In operation 610, the method may include sending the variance time-taken per byte-data by the task to the LT manager 125 which may act as reinforcement data for the optimization. The method may allow the AI 112 to send the variance time-taken per byte-data by the task to the LT manager 125 which may act as the reinforcement data for the optimization.

The various actions, acts, blocks, steps, or the like in the method and the conceptual diagram 600 may be performed in the order presented, in a different order or simultaneously.

Further, in some example embodiments, some of the actions, acts, blocks, steps, or the like may be omitted, added, modified, or skipped, without departing from the scope of the present disclosure.

Figure 7:
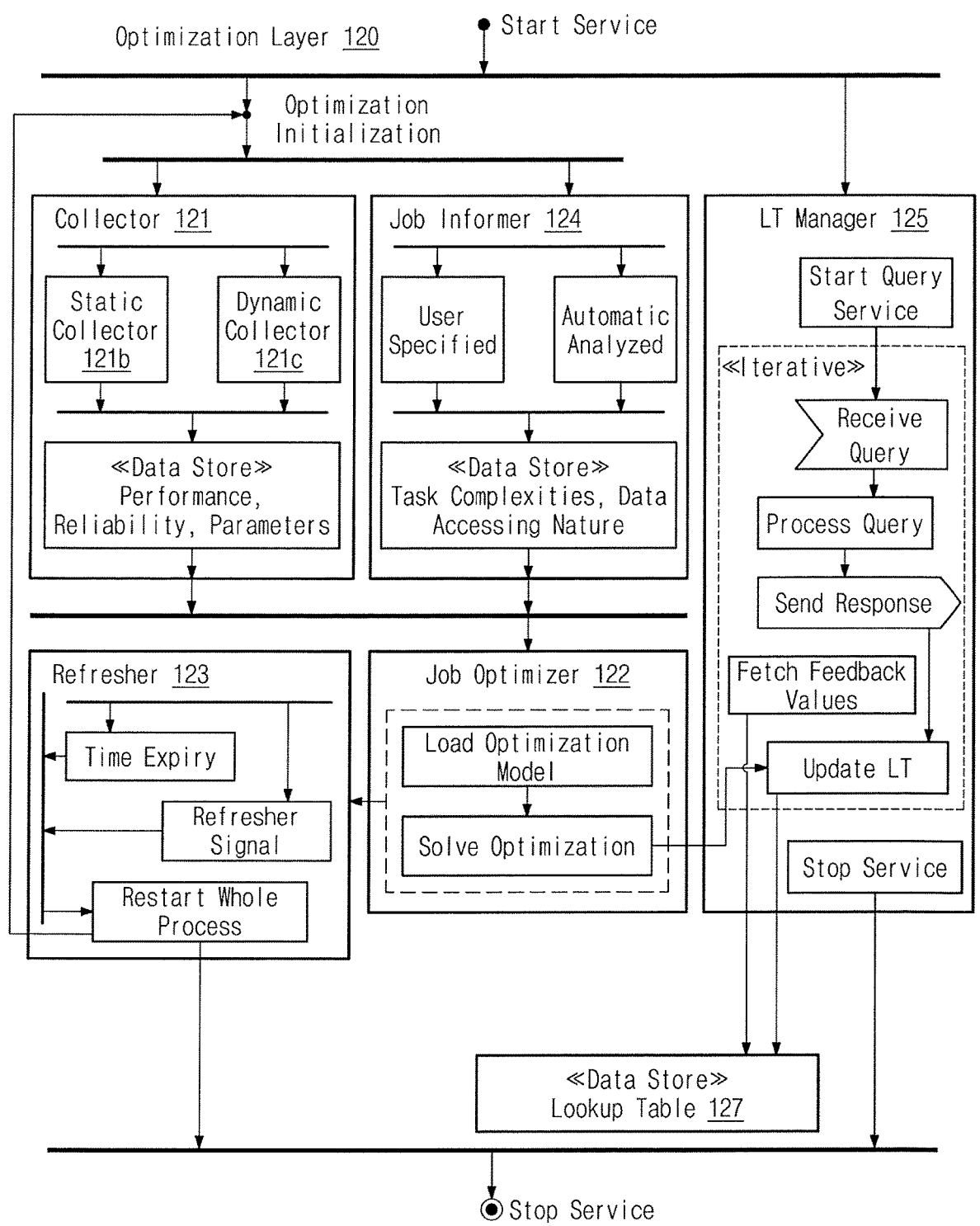
FIG. 7 is a conceptual diagram illustrating various operations involved in an optimization process/optimization layer, according to some example embodiments.

FIG. 7 is a conceptual diagram 700 illustrating various operations involved in the optimization process/optimization layer 120, according to some example embodiments. The optimization layer 120 may run only one instance in the entire distributed heterogeneous computer system 300. Further, the optimization layer 120 may initiate its processes by triggering the LT manager 125 and the job optimizer 122 in parallel. The LT manager 125 may initiate the query and response service and may listen to the queries received from the AI 112. The queries may be any ones of following types as described below:

Data Distribution Vector Query:

The AI 112 may initiate the query for the particular task identifier to get the optimized data distribution vector. Further, the LT manager 125 may fetch the data distribution vector from the LT 127. If the data distribution vector is unavailable in the LT 127, the LT 127 may respond with the default data distribution vector. In some examples, the received data distribution vector query expected by the LT Manager 125 may have the format below:

Query Type="Data Distribution Vector", Task ID='1'"

Further, on receiving the above data distribution vector query, the LT manager 125 may respond with following values:

Task ID="1", Node1=0.2, Node2=0.1, Node3=0.3, Node4=0.3, Node N=0.1, Expected Time=1.2

The table entries may have the same meaning as the LT 127 entries. The task identifier field in the above query may be NULL, which may specify an unknown task.

Feedback Query:

The AI 112, after scheduling the task based on the data distribution vector, may return the time-variance taken per byte to the LT manager 125. Further, the LT manager 125 may update the information into the LT 127 only if the received value is greater than the current value in the LT 127. The sample feedback query may have the format below:

Query Type="Feedback", Task ID='1", Variance Report=0.02

On receiving the feedback query, the LT manager 125 may update the variance entry in the LT 127, if the variance reported is maximum. The AI 112 may not wait for an acknowledgment from the LT manager 125.

Shutdown Query:

The LT manager 125 may receive an asynchronous shutdown query from external sources. On receiving the shutdown query, the LT manager 125 may initiate the shutdown request to the job optimizer 122.

Query Type="Shutdown"

The optimization layer 120 may perform the task of optimization. After each of the iteration, the optimization layer 120 may output the data distribution vector for every task known to the distributed heterogeneous computer system 300. This data distribution will be assumed to be valid till the next iteration.

The details of the collector 121 will be described in conjunction with FIG. 8. The details of the job optimizer 122 will be described in conjunction with FIGS. 9a and 9b. The details of the job informer 124 will be described in conjunction with FIG. 10. The details of the refresher will be described in conjunction with FIG. 12

Figure 8:
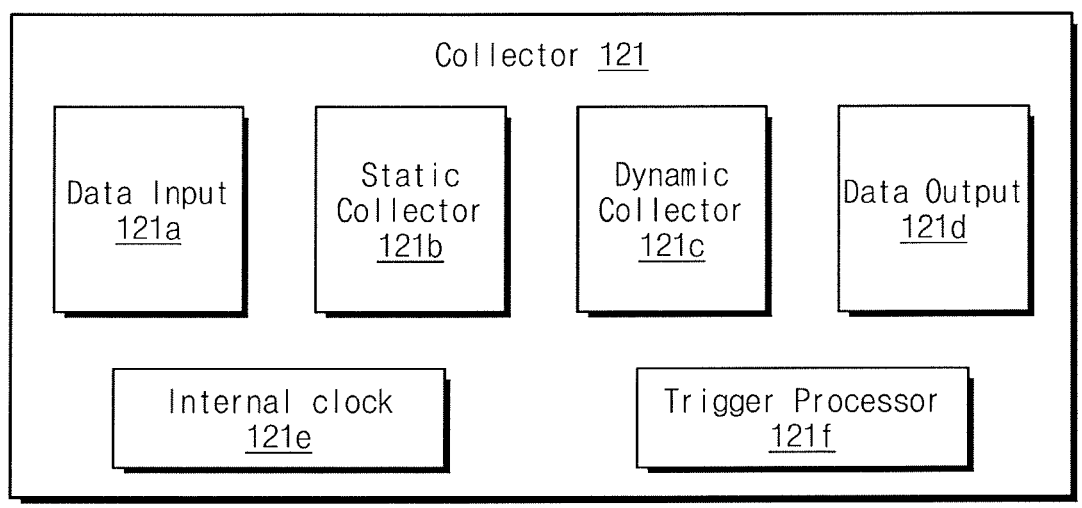
FIG. 8 illustrates a block diagram of a collector for dynamically collecting a workload value on each of the computer node, according to some example embodiments.

The FIG. 8 illustrates a block diagram of the collector 121 for dynamically collecting the workload value on each of the computer nodes 100, according to some example embodiments. The collector 121 may include a data input 121a, a static collector 121b, a dynamic collector 121c, a data output 121d, an internal clock 121e, and a trigger processor 121f.

The collector 121 may be configured to collect the parameter values which are required by the job optimizer 122. The static collector 121b may collect static parameters (e.g., maximum memory capacity, maximum processor-clock speed, or the like). The static parameters may not be changed frequently or change may occur due to some external event such as hardware upgrade. Therefore, the static collector 121b may be invoked through interface of the data input 121a only when the external event has occurred and the trigger event is processed through the trigger processor 121f.

The dynamic collector 121c may be configured to collect dynamic parameters (e.g., memory usage, current processor usage and processor temperature, or the like), which may be collected through interface of the data input 121a periodically in time. The dynamic collector 121c may perform sampling of the continuous data in response to the internal clock 121e. In some example embodiments, the collector 121 may be designed in such a way that the collector 121 may be extended; for example, newer collector(s) may be added later based on the system configuration update. The collector 121 may output value (e.g. via interface of the data output 121d) as a "key=value" pair, where the key may define the unique parameter name being considered by the optimization mathematical model.

Figure 9A:
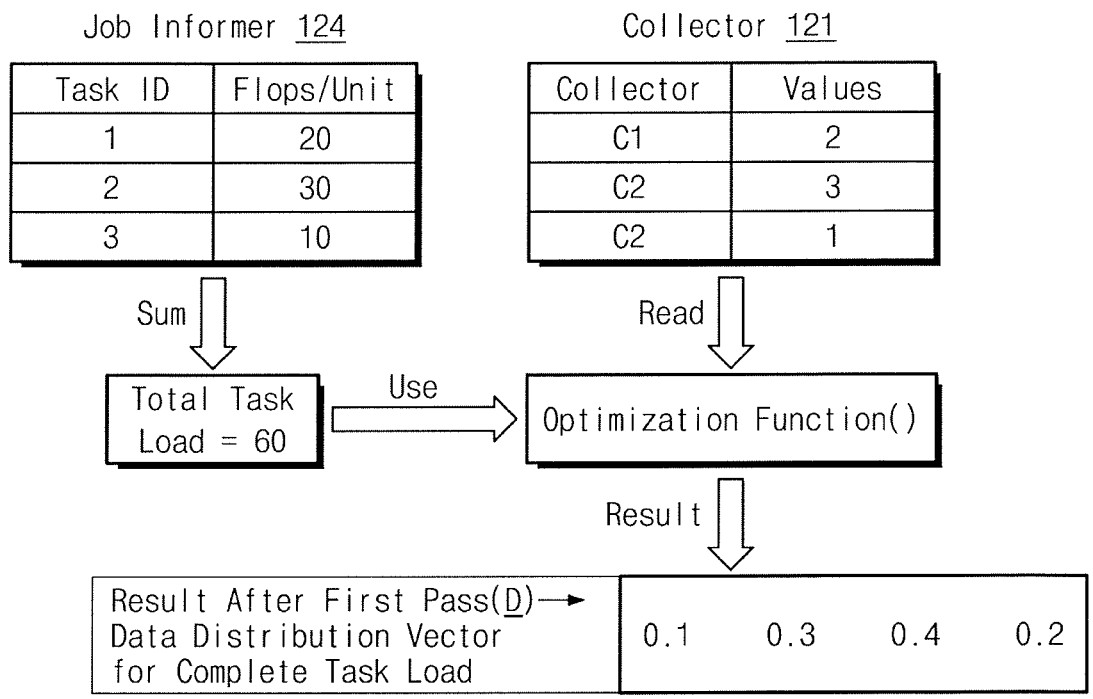
FIG. 9a illustrates an example of an optimization process for obtaining data distribution vector for complete task load, according to some example embodiments.

FIG. 9a illustrates an example of an optimization process for obtaining a data distribution vector for complete task load, according to some example embodiments. The job optimizer 122 may receive data from the collector 121 and the job informer 124, and then may initiate the optimization technique (e.g. a simple method in case of a linear optimization problem). The job optimizer 122 may initiate the optimization process based on the following proposed mathematical framework:

$$\operatorname*{argmin}_{D=[D_k], k \in K} t = \sum_{K_P \subseteq K=\{1,\ldots,m\}} \max_{p \in K_P} \{t_p\} =$$

$$\sum_{K_P \subseteq K=\{1,\ldots,m\}} \max_{p \in K_P} \{f(P_p, R_p, E_p, D_p)\} \; subject to \; C \stackrel{def}{=} \{C_p\},$$

$$D_k \in [0,1] \forall k \in K, \sum_{k \in K} D_k = 1 \; and \; t > 0$$

where "D" is a data distribution vector which minimizes the total execution time "t" under the set of constraints C={$C_p$} for each of m computer nodes 100 assuming "P" of them may function simultaneously/independently of each other in terms of critical resources.

The value of "P" may range from 1 to m, and p may be an element of set $K_p$ which is a subset of K with maximum cardinality of P. Further, the individual execution times $t_p$ may have a function of, performance metrics (e.g., computer node speed, node data capacity or the like as applicable—$P_p$), reliability metrics (e.g., mean time between failures (MTBF) or the like—$R_p$), extra factors (e.g., task nature metrics, data nature metrics, task-node preferences, energy friendliness or the like—$E_p$), and data distribution ratios (%) denoted by $D_k$'s. The above framework has convex with single minimum, that is, unique solution exists if the Jacobian matrix is positive definite. The parameters $C_p$, $P_p$ and $R_p$ may be created from collector 121. The parameter $E_p$ may be created from job informer 124. The function f may describe the mathematical model being used for optimization (which may be linear/non-linear, probabilistic, or hybrid).

In first pass, a number of floating point operations (FLOPs, flops) required per data unit may be calculated for every task listed in job informer 124 based on task complexity. This load may be added for every task to get the total load. The total load may be applied to the mathematical framework above containing current $C_p$, $P_p$, $R_p$ and $E_p$. Further, the optimization techniques like simplex method, gradient descent/ascent, interior-point method or the like may be used to solve the mathematical model. After the first pass, the task may be left with a single data distribution vector for total load.

For example, as shown in the FIG. 9a, it will be supposed that total load is 60 flops/unit (=20+30+10). Values in the collector 121 may be given as Matrix Collector "$I_c$" [2, 3, 1] for three different collectors. It will be further supposed that the heterogeneous computer system have 4 different computer nodes 100 and all tasks have equal affinity to the computer nodes 100. Followed optimization model herein is as follows:

$$\text{Time}=60*I_c*A*cn1+60*I_c*B*cn2+60*I_c*C*cn3+60*I_c*D*cn4$$

In the above equation, an optimal value for the variables cn1, cn2, cn3, cn4 should be determined, which is the data distribution value for each computer node 100. For a given constant A, B, C, and D (which depends upon the mathematical model), the total time may be minimized. For example, the given constant may be as follows:

A=Transpose [2.5, 3.5, 0.5]
B=Transpose [0.8, 1.17, 0.167]
C=Transpose [0.65, 0.875, 0.125]
D=Transpose [1.25, 1.75, 0.25]

Further, the execution of simplex technique may result in the optimal value of cn1, cn2, cn3 and cn4 to be 0.1, 0.3, 0.4 and 0.2 respectively.

Figure 9B:
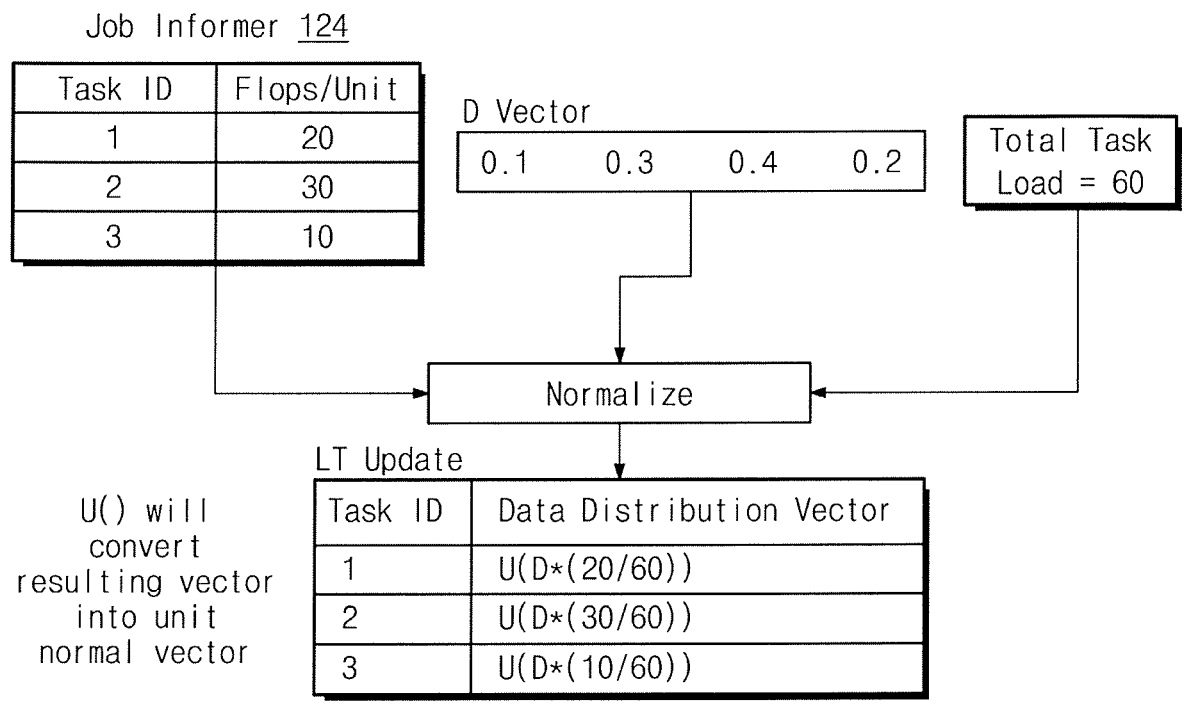
FIG. 9b illustrates an example of a normalization process for converting a data distribution vector into a normal vector, according to some example embodiments.

FIG. 9b illustrates an example of a normalization process for converting the data distribution vector into a normal vector, according to some example embodiments.

In second pass, the job optimizer 122 may use the data distribution vector of total load and may normalize the total load for every task listed in the job informer 124. The normalization may be done based on load contribution of the task to the total load to get its data distribution vector. The normalized vector for every task may be updated in the LT 127.

FIG. 10 illustrates the job informer/task information store 124 for maintaining an information store for different tasks being run on the distributed heterogeneous computer system 300, according to some example embodiments.

The job informer 124 may store the task identifier, complexity and optimization model extra parameters. The task identifier may be the unique task identifier which is given to the task. The complexity may be defined by the following notations: 1, 2, e1, e2 or the like, where 1=O(n), 2=O(n$^2$), e1=O(e$^n$), and e2=O(e$^{n^2}$). The extra parameters may be related to data access behaviors, computer node preferences, or the like. The job informer 124 may involve two steps to gather the required information.

User Configuration File Loader:

The user of the distributed heterogeneous computer system 300 may provide a configuration file containing information associated with commonly known task. Further, the job informer 124 may load and update its information store. The format of configuration file is implementation dependent.

Automatic Analysis:

Automatic analysis may involve analyzing the unknown task and gather required information, and may update the information in the job informer 124. The unknown tasks may be those tasks for which the user has not supplied any information. Whenever the LT manager 125 receives data distribution query with a "task identifier" filled as NULL, the LT manager 125 may provide a unique task identifier to the unknown task, and may trigger the job informer 125 to start the analysis of the unknown task and try to gather required information.

Figure 11:
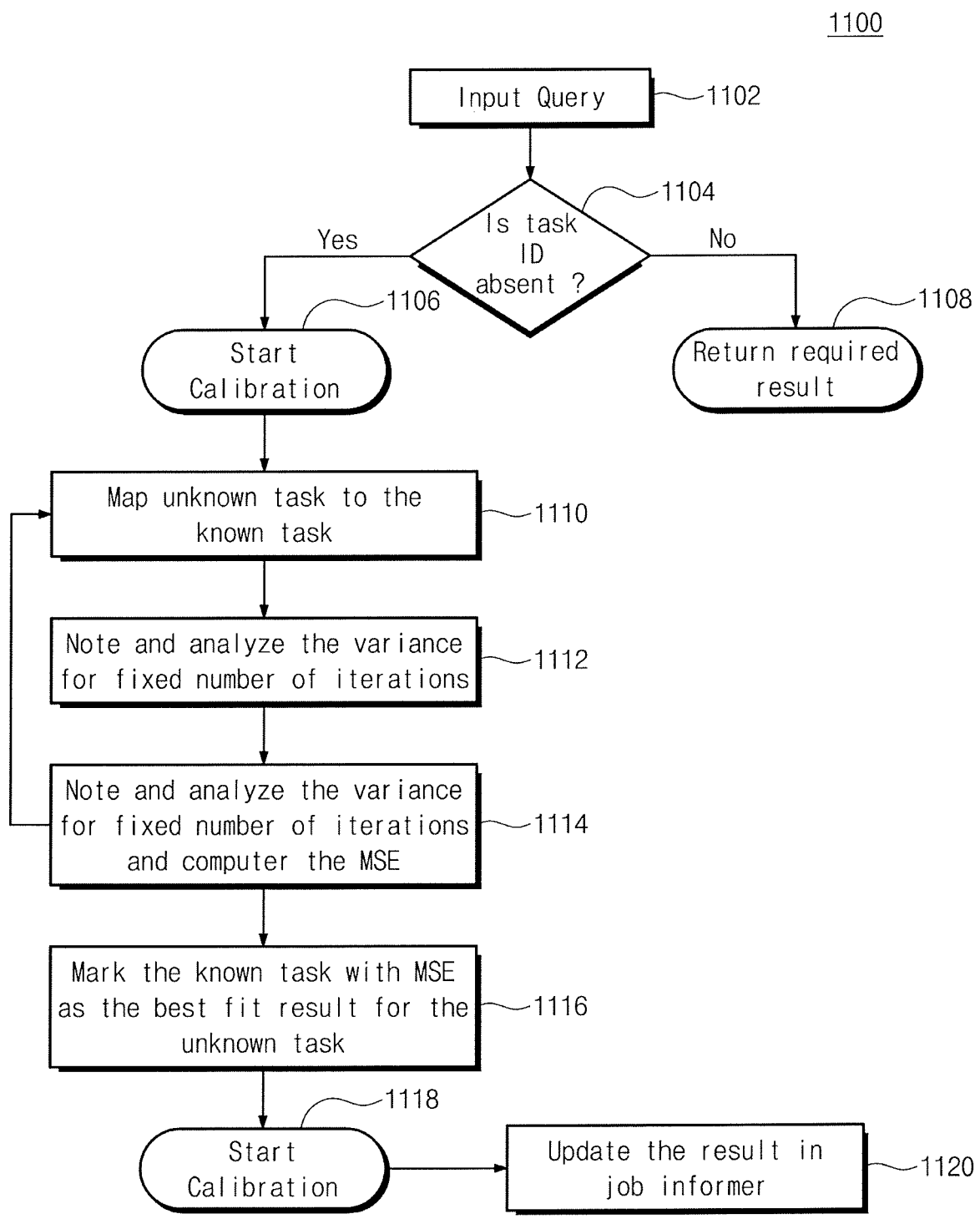
FIG. 11 is a flow diagram illustrating a method for generating task information for an unknown task identifier, according to some example embodiments.

FIG. 11 is a flow diagram 1100 illustrating a method for generating task information for the unknown task identifier, according to some example embodiments. In operation 1102, the method may include an input query to the LT manager 125 for the data distribution vector for the particular task identifier. In some example embodiments, the method may allow the AI 112 to input query to the LT manager 125 for the data distribution vector for the particular task identifier.

In operation 1104, the method may include determining whether the requested task identifier is present or absent in the job informer 124. In some example embodiments, the method may allow the LT manager 125 to determine whether the requested task identifier is present or absent in the job informer 124. If the task identifier is absent in the job informer 124, the job informer 124 may initiate the automatic analysis process (e.g., calibration) in operation 1106. If the job informer 124 determines that the task identifier is present, the job informer 124 may return with the required task information in operation 1108.

In operation 1106, the method may include initiating the automatic analysis process to determine the information for the task identifier. If the information is not available for the particular task identifier, the task identifier may be marked with a calibration tag. The method may allow the job informer 124 to initiate the automatic analysis process to determine the information for the task identifier. If the information is not available for the particular task identifier, the task identifier may be marked with the calibration tag.

In operation 1110, the method may include mapping unknown tasks to the known tasks using automatic analysis and returning the data distribution vector for the known task model. The method may allow the job informer 124 to map unknown tasks to the known tasks using automatic analysis and return the data distribution vector for the known task model.

In operation 1112, the method may include analyzing the variance for the fixed number of iterations. The method may allow the job informer 124 to analyze the variance for the fixed number of iterations using the automatic analysis. In operation 1114, the method may include computing a mean square error (MSE) based on the analysis of the variance calculated during the fixed number of iterations. The method may allow the job informer 124 to compute the MSE based on the analysis of the variance calculated during the fixed number of iterations. Further, the same process may be repeated for all the unknown task identifiers with all the known task models.

In operation 1116, the method may include marking the known task with the minimum MSE as the best fit result for the unknown task. The method may allow the job informer 124 to mark the known task with the MSE as the best fit result for the unknown task. For example, the task model which results in the lowest MSE may be used as best fit task model for the unknown task.

In operation 1118, the method may include initiating calibration to remove the calibration tag for the unknown task identifier. The method may allow the job informer 124 to initiate calibration to remove the calibration tag for the unknown task identifier. In operation 1120, the method may include updating the unknown task identifier with the information of best-fit task model for future references. The method may allow the job informer 124 to store/update the unknown task identifier with the information of best-fit task model for future references.

The various actions, acts, blocks, steps, or the like in the method and the flow diagram 1100 may be performed in the order presented, in a different order or simultaneously. Further, in some example embodiments, some of the actions, acts, blocks, steps, or the like may be omitted, added, modified, or skipped, without departing from the scope of the present disclosure.

Unlike the conventional systems and methods, the proposed system may help in energy saving (from overall system's point of view: processor+heat sink/cooler/fan+board+disk/memory and the like). To summarize, total energy consumed is proportional to sum of energies supplied to and consumed by the computer nodes 100 (e.g., processor, cooler/fan system, disk access drivers, memory, and other components on the board). Further, the energy dissipated by computer nodes 100 is directly related to the area of the temperature profile which in turn is dependent on the processing load and rate:

$$E \propto \int_{t}^{t+t_{total}} (T_{core} - T_{ambient}) dt$$

Since the temperature profile and its first derivative are continuous, the average value is given by:

$$T_{average} = \frac{1}{t_{total}} \int_{t}^{t+t_{total}} (T_{core} - T_{ambient}) dt$$

Thus, average temperature is directly related to energy dissipated by the computer nodes 100. It may be important, to first order of approximation, to maintain processor core temperature of the computer nodes 100 at optimum level to achieve energy saving in the computer nodes 100. This may be achieved by coolers and fan system. This is not a fool-proof method as those systems also consume energy to operate. A better alternative is to distribute the operations between the multiple computer nodes 100 by which overall system's energy consumption may be kept in check. It will be considered that the distributed heterogeneous computer system 300 consists of processors and co-processors and considers tasks that may run simultaneously over processor and co-processors.

Case I. Constant Clock Frequency:

It will be assumed that as the task is executed, the processor frequency remains unchanged (e.g., there is no over-clocking or under-clocking).

Sub Case 1:
the data distribution among computer nodes 100 is identical in nature.
Sub Case 2:
the data distribution among computer nodes 100 is not identical in nature.

Case II. Dynamic Clock Frequency:

Modern processors in computer nodes 100 are equipped with PROCHOT# signal, after which processors change their frequency to prevent over-heating. This will change processing speed of the computer nodes 100 and rate at which it gets heated. The energy bias is calculated for the distributed heterogeneous computer system 300 having two identical processors. Energy bias may reflect the amount of energy saved using the proposed method:

$$\text{bias} = [E_{total}^{nd} - (E_{total}^{d1} + E_{total}^{d2})] > 0$$

where, $E_{CPU}^{nd}$ is energy required when there is no data distribution, and $E_{total}^{d1}$, $E_{total}^{d1}$ is energy required if $d_1$ data is supplied to first identical processor and $d_2$ data is supplied to second identical processor. They are given by:

$$E_{CPU}^{nd} \propto f_{default}(t_x - t_1) +$$
$$f_{uc}(t'_2 - t_x) + \left[\frac{1}{2} \times (T'_{cf} - T_{ci}) + (T_{ci} - T_{ambient})\right] \times (t'_2 - t_1)$$

$$E_{total}^{d1} \propto \left[\frac{1}{2} \times (T'_{cf1} - T_{ci1}) + (T_{ci1} - T_{ambient})\right] \times (t'_{21} - t_{11}) +$$
$$f_{default1}(t_{x1} - t_{11}) + f_{uc1}(t'_{21} - t_{x1})$$

$$E_{total}^{d2} \propto \left[\frac{1}{2} \times (T'_{cf2} - T_{ci2}) + (T_{ci2} - T_{ambient})\right] \times (t'_{22} - t_{12}) +$$
$$f_{default2}(t_{x2} - t_{12}) + f_{uc2}(t'_{22} - t_{x2})$$

Unlike the conventional systems and methods, the proposed method may perform a theoretical analysis of reliability of the distributed heterogeneous computer system 300. Reliability (as quantified by inverse of failure rate or probability of failure) is a temperature-dependent entity and it decreases as temperature increases. Thus, it is critical to maintain temperature at lower levels on an average. So to facilitate better understanding, the case will be considered where no data distribution is compared to optimum Data distribution. Using the proposed method, comparing the case when single processor is handling all data load and the case when using the proposed data distribution where multiple processors/co-processors exist, the energy spent may be lesser in the latter case. This holds true for any random/localized data distribution and optimum data distribution using the proposed method. The localized data distribution technique does not have the complete visibility, like the local processor schedulers. Thus, from the relationship established, the average temperature is comparatively lower in the latter case and thus, it may result in lower failure rates, higher MTBF and finally in higher reliability.

Unlike the conventional systems and methods, the proposed method may be lesser dependency on system and an environment. In some examples to show that the proposed system and method is less dependent to system and the environment, the proposed system may basically include two systems having different configurations. First system may consist of a slower processor (e.g., a slower CPU) and a slower co-processor (e.g., a slower GPU). Second system may consist of a faster processor and a faster GPU.

The sample application may be developed for blurring an image using the above proposed method and system. System configurations chosen are such that the second system may be thought as an upgrade version of the first system. Blur application developed may be optimized for the first system. So in current scenario with update of the first system to the second system, application optimized for the first system may need to be updated. But herein, as application is developed using the proposed method, it may run on the second system with similar optimization. This may be experienced by modifying the optimization technique to give different data distribution vectors for every call.

Figure 12:
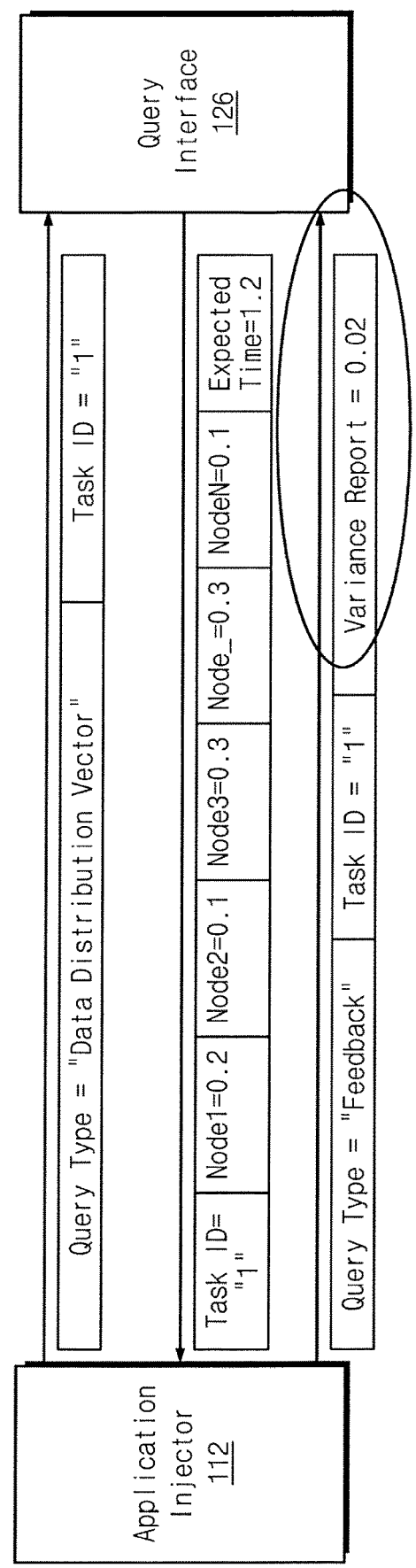
FIG. 12 illustrates an example scenario in which a refresher is triggered for an optimization process, according to some example embodiments.

FIG. 12 illustrates an example scenario in which the refresher 123 is triggered for an optimization process, according to some example embodiments. The refresher 123 may trigger for the start of next iteration of the above optimization process. The trigger may be due to periodic timer expiration or due to an external cause. Timer based trigger may be used to start next optimization iteration after some time interval. Based on the variance entries in the LT 127 for previous iteration, the timer interval may be increased or decreased.

The refresher 123 may follow multiplicative increase and additive decrease (MIAD) approach for changing the timer interval/time stamp based on feedback. If MSE is under user-specified threshold, the timer interval may be increased else the timer interval may be decreased. External signal may be triggered to start next iteration only if system undergoes some changes. Timestamp in the refresher 123 may be increased if the variance reported by all active applications is less than a threshold. The timestamp in the refresher 123 may be decreased if the variance reported by all active applications is not within the specified threshold. Using a variance value entry in the LT 127, mean square error (MSE) may be calculated.

Figure 13:
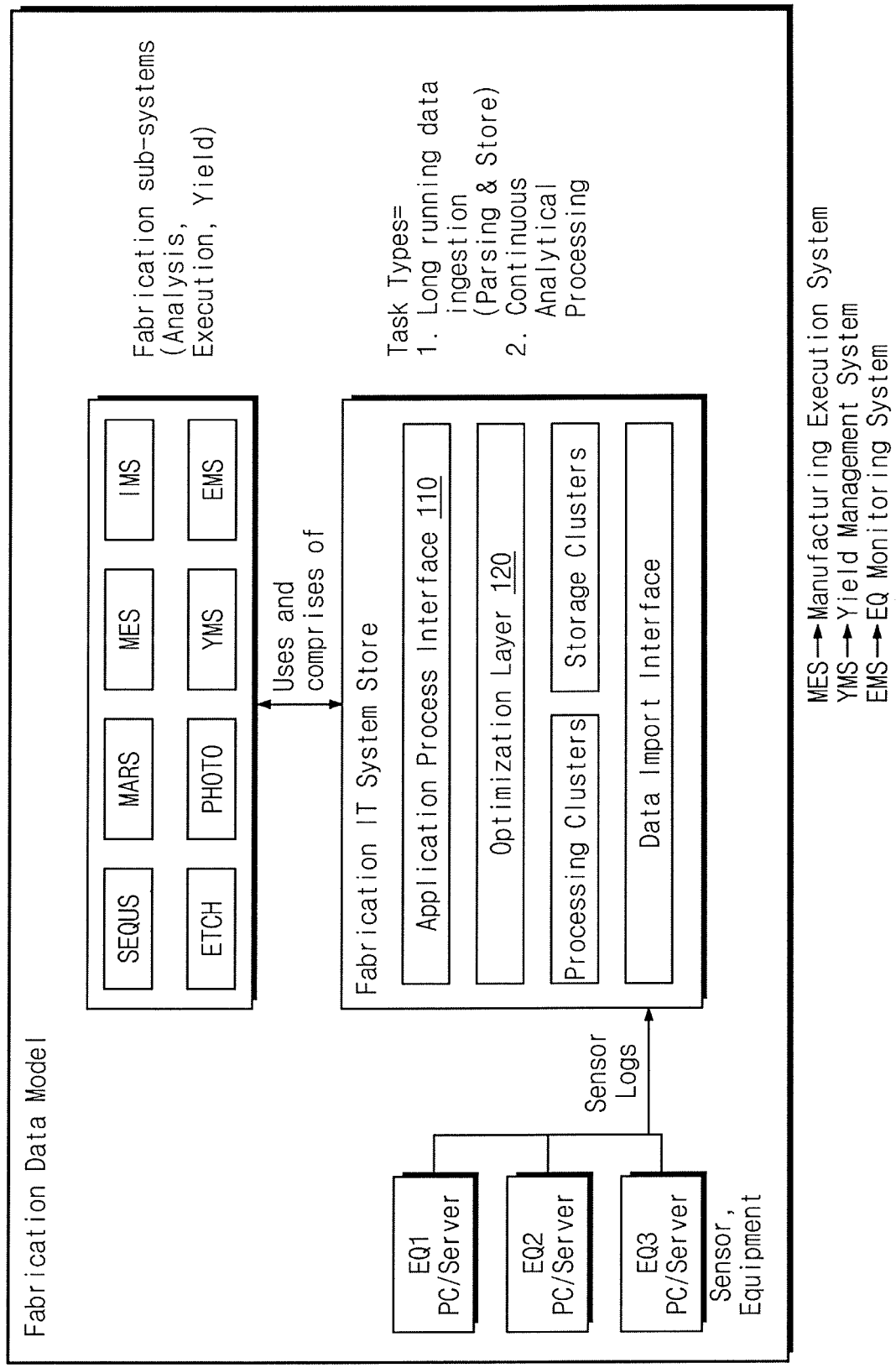
FIG. 13 is block diagram illustrating a fabrication industry use case, according to some example embodiments.

FIG. 13 is block diagram illustrating a fabrication industry use case, according to some example embodiments. In this fabrication industry use case scenario, equipment (EQ) sensor data along with other data (building up to 60 TB per year) may be processed continuously by a processing supercluster called Data Lake. The usage of the proposed mechanism would mitigate degradation of reliability (and longer downtime) during hardware/software upgrades and during addition of new systems (or tasks). The upgrade will perform optimally and hence may be done seamlessly.

Unlike the conventional system and methods, the proposed system and method may be pushed as part of the fabrication application writing standard as per Industry 4.0 envision. Unlike the conventional system and methods, the proposed system may play a very critical role in devising the IT infrastructure backbone needed to analyze huge data generated during for chip fabrication operations, and the analyzed result may be used to maximize the fabrication line's yield directly.

In case of the fabrication industry after fabrication size changes from 14 nm to 10 nm and further, the amount of data generated may increase exponentially, and this calls for huge processing clusters to analyze data. A small amount of energy saved in the process may provide huge benefit to entire fabrication line by lowering its operation cost. The proposed system and method may play a very important role in energy saving of the processing clusters in the fabrication industry.

In the conventional systems and methods, hardware upgrades for the existing software layer may render the solution out of sync due to strong linkage of optimization process and application process with hardware. However, the proposed system and method may decouple the optimization process and the application process, hence the cost of hardware upgrade may be much lower compared to conventional upgrade mechanisms.

Figure 14:
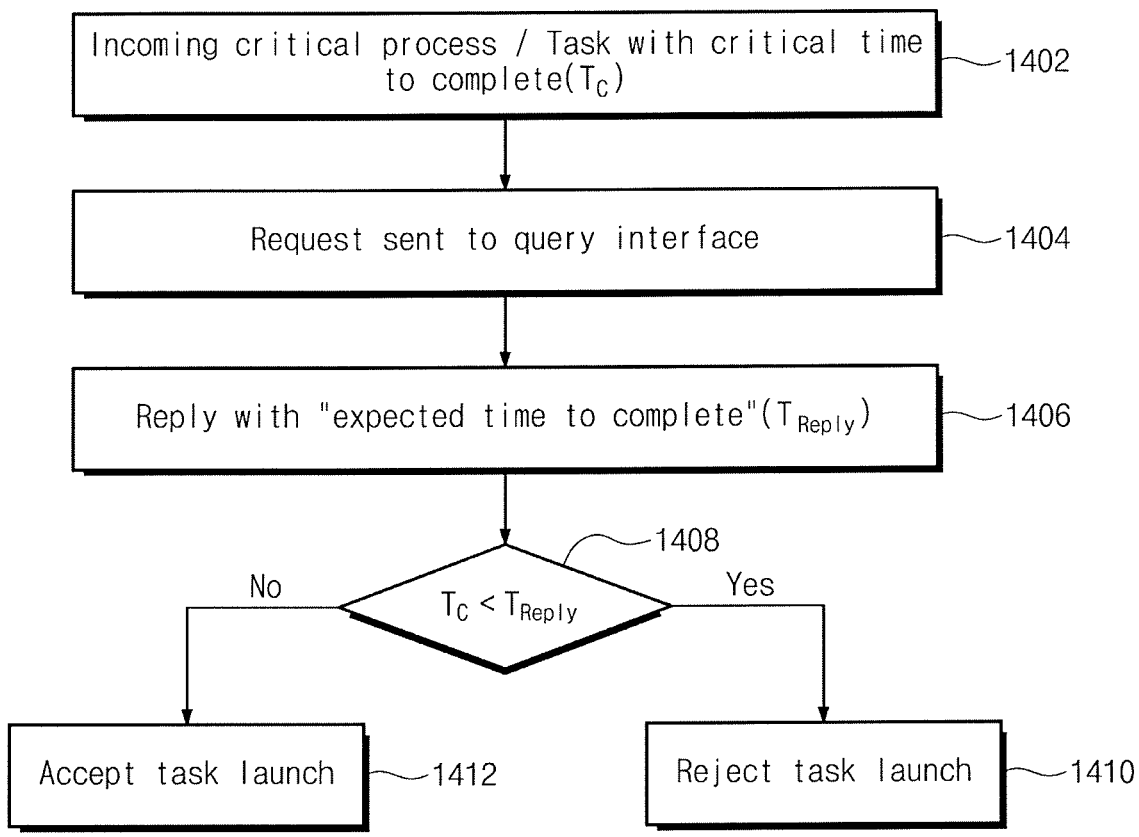
FIG. 14 is a flow diagram illustrating a real-time operating system in a distributed heterogeneous computer system, according to some example embodiments.

FIG. 14 is a flow diagram 1400 illustrating a real-time operating system (RTOS) in the distributed heterogeneous computer system 300, according to some example embodiments.

In operation 1402, the method may include receiving an incoming critical process/task with critical time ($T_c$) to complete. The method may allow the AI 112 to receive the incoming critical process/task with critical time ($T_c$) to complete.

In operation 1404, the method may include sending the incoming critical process request to the query interface 126. The method may allow the AI 112 to send the incoming critical process request to the query interface 126.

In operation 1406, the method may include replying an expected time ($T_{Reply}$) to complete the incoming critical process. The method may allow the query interface 126 to reply the expected time ($T_{Reply}$) to complete the incoming critical process.

In operation 1408, the method may include checking whether the critical time is less than the expected time to complete. The method may allow the AI 112 to check whether the critical time is less than the expected time to complete. If the AI 112 determines that the $T_c < T_{Reply}$, the AI 112 may rejects task launch in operation 1410, else may accept the task launch in operation 1412.

The real-time operating system is one of the use-case that the proposed method may support. In the fabrication industry, there may be some time-critical tasks (e.g., scheduling) which require the real-time operating system. Currently, an equipment (EQ) performing those tasks may rely on a special operating system imposing the real-time operating system. This may result in separation of EQ into two groups: one may work on the real-time operating system, and the other may work on a normal operating system. The application developer may have to design software separately for both the operating systems. However, the proposed method may provide the application developer inherently with the benefit to impose Soft-RTOS like constraint while doing application development. When the AI 112 queried for a data distribution vector for a task, the data distribution vector may have expected completion time. Using this expected completion time, the application developer may decide whether to schedule critical task or not. This enabling of decision taken at an application side is referred as Soft-RTOS like constraint.

The proposed method and system may help in achieving the Soft-RTOS over the heterogeneous computer nodes 100. The data distribution vector may be calculated for the task, which signifies that it is running in optimum manner considering all the system parameters. Therefore, depending upon the data load and time constraint provided by task in the real-time operating system scenario, the proposed method and system may decide whether the task will be run within the expected time or not.

There is an increasing need for computing due to popularity of hardware-less test-bed simulator. Huge servers are required sometimes in order to simulate the actual hardware to facilitate the software development intended for that hardware. In this kind of scenarios, the proposed method may be easily scalable, save energy and increase reliability.

Currently, no operating system provides optimized data distribution for task between the heterogeneous computer nodes 100. The proposed method may be made as a part of the operating system, so that data distribution for task between the heterogeneous computer nodes 100 may be seamless. This may help in saving battery energy, increasing device reliability and enabling optimum use of different computer nodes 100.

Figure 15:
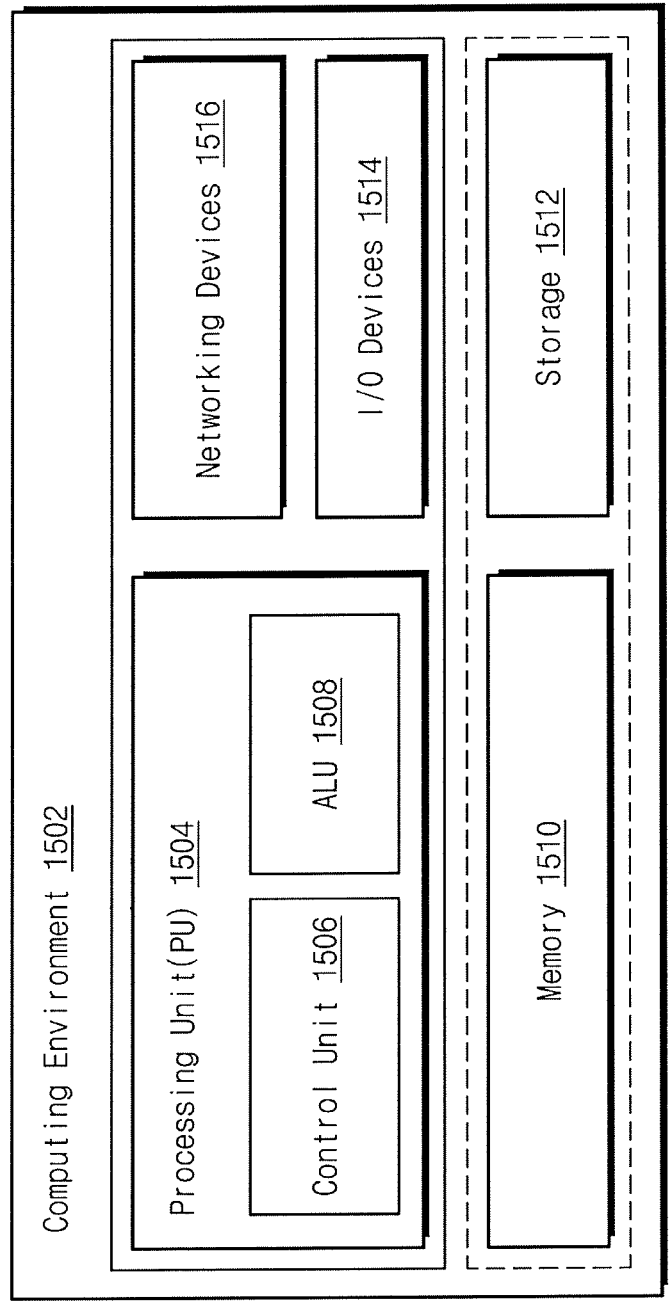
FIG. 15 illustrates a computing environment implementing a method and a distributed heterogeneous computer system for dynamically reallocating resources for optimized job performance, according to some example embodiments.

FIG. 15 illustrates a computing environment 1502 implementing the method and the distributed heterogeneous computer system for dynamically reallocating resources for optimized job performance, according to some example embodiments. As depicted in FIG. 15, the computing environment 1502 may include at least one processing unit 1504 which is equipped with a control unit 1506 and an arithmetic process unit (ALU) 1508, a memory 1510, a storage unit 1512, a plurality of networking devices 1516, and a plurality of input/output (I/O) devices 1514.

The processing unit 1504 may be responsible for processing the instructions of the proposed method. The processing unit 1504 may receive commands from the control unit 1506 in order to perform its processing. Further, any arithmetic operations involved in the execution of the instructions may be computed with the help of the ALU 1508.

The storage unit 1512 may include one or more computer-readable storage media. The storage unit 1512 may include non-volatile storage elements. As examples of such non-volatile storage elements, there may be magnetic hard discs, optical discs, floppy discs, flash memories, electrically programmable memories (e.g., EPROM) and/or electrically erasable and programmable memories (EEPROM). In addition, the storage unit 1512 may, in some examples, be considered a non-transitory storage medium. The term "non-transitory" may indicate that the storage medium is not embodied in a carrier wave or a propagated signal. However, the term "non-transitory" should not be interpreted to mean that the storage unit 1512 is non-movable. In some examples, the storage unit 1512 may be configured to store larger amounts of information than the memory. In some examples, a non-transitory storage medium may store data that may, over time, change (e.g., data in random access memory (RAM) or cache memory).

The example embodiments disclosed herein may be implemented through at least one software program running on at least one hardware device and performing network management functions to control the elements. The elements shown in FIGS. 1 to 15 may include blocks which may be at least one of a hardware device, or a combination of hardware device and software module.

The example embodiments may provide a distributed heterogeneous computer system with a plurality of computer nodes for dynamically reallocating resources for optimized job performance.

The example embodiments may provide an application injector at the at least one computer node from the plurality of computer nodes for invoking the at least one job to be performed.

The example embodiments may provide a collector at the at least one computer node for dynamically collecting a workload value on each of the computer nodes.

The example embodiments may provide a job informer at the at least one computer node for determining known and unknown jobs on each of the computer nodes.

The example embodiments may provide a job optimizer at the at least one computer node for determining a data distribution vector based on the workload value and the known and unknown jobs on each of the computer nodes, wherein the data distribution vector defines an amount of data to be distributed among the plurality of nodes to perform the at least one job.

The example embodiments may provide a mechanism for decoupling an application layer and an optimization layer.

According to the present disclosure, it may be possible to free an application developer from an optimization task, thus a quick update may also be possible. As the optimization task is performed independently and having complete visibility of all computer nodes, global optimization value may be reached, thus ensuring better cost saving and enhancing the reliability of the individual computer nodes. Furthermore, the present disclosure may help in energy saving from overall system's point of view.

The foregoing descriptions of the specific example embodiments may fully reveal the general nature of the technical spirit so that those skilled in the art may, by applying current knowledge, readily modify or adapt such specific example embodiments for various applications without departing from the generic concept, and, therefore, such adaptations and modifications should and are intended to be comprehended within the meaning and scope of equivalents of the disclosed example embodiments. It is to be understood that the phraseology or terminology employed herein is for the purpose of description and not of limitation. Therefore, while the example embodiments have been described in terms of specific example embodiments, those skilled in the art will recognize that the example embodiments may be practiced with modification within the technical spirit and scope of the example embodiments as described herein.

What is claimed is:

1. A distributed heterogeneous computer system, comprising:
   a plurality of computer nodes, each of the plurality of computer nodes being operatively connected through a network interface to a network to provide data communication between the plurality of computer nodes, wherein each of the plurality of computer nodes includes:
   an application layer;
   an optimization layer configured to be decoupled from the application layer; and
   one or more processors configured to perform operations of the application layer and the optimization layer,
   wherein the application layer includes:
   an application injector configured to invoke at least one job to be performed; and
   an application specific component configured to share a task type of the at least one job, which indicates whether the at least one job is normal or critical, and a data load for the at least one job to the application injector,
   wherein the optimization layer includes:
   a collector configured to dynamically collect a workload value being a function of at least one of a performance metric, a reliability metric, an extra factor, and a data distribution ratio on the each of the plurality of computer nodes;
   a job informer configured to determine respective types of known and unknown jobs on the each of the plurality of computer nodes;
   a job optimizer configured to determine a data distribution vector based on the workload value and the respective types of the known and unknown jobs on each of the computer nodes, the data distribution vector defining a respective amount of the data load to be distribute among the plurality of computer nodes to perform the at least one job;
   a lookup table configured to store the data distribution vector; and a lookup table manager configured to maintain the lookup table and provide a query interface to the application injector, wherein the application injector is further configured to send a query for a task identifier of the at least one job to the lookup table manager through the query interface, receive the data distribution vector from the lookup table manger through the query interface, and schedule the at least one job based on the data distribution vector, wherein the lookup table manager is further configured to transmit the data distribution vector from the lookup table to the application injector in response to the query, wherein the application injector is further configured to return a time-variance taken per byte to the lookup table manager after scheduling the at least one job based on the data distribution vector, wherein the lookup table manager is further configured to update a variance entry in the lookup table when the returned time-variance is greater than a current value of the variance entry in the lookup table.

2. The distributed heterogeneous computer system of claim 1, wherein the job informer is further configured to perform an automatic analysis of the unknown jobs in response to the lookup table manager.

3. The distributed heterogeneous computer system of claim 1, wherein the workload value is a function of at least one of performance, reliability metric, extra factor, and data distribution ratio.

4. The distributed heterogeneous computer system of claim 1,
wherein the optimization layer further includes a refresher configured to use a difference between an expected time and an actual time of running of the at least one job to dynamically determine a time period for managing the performance of the at least one job on the each of the plurality of computer nodes.

5. The distributed heterogeneous computer system of claim 1,
wherein the data distribution vector is determined using at least one of a linear optimization model and a non-linear optimization model.

6. A distributed heterogeneous computer system, comprising:
a plurality of computer nodes, each of the plurality of computer nodes being operatively connected through a network interface to a network to provide data communication between the plurality of computer nodes,
wherein each of the plurality of computer nodes includes:
an application layer;
an optimization layer configured to be decoupled from the application layer; and
one or more processors configured to perform operations of the application layer and the optimization layer,
wherein the application layer includes:
an application injector configured to invoke at least one job to be performed; and
an application specific component configured to share a task type of the at least one job, which indicates whether the at least one job is normal or critical, and a data load for the at least one job to the application injector,
wherein the optimization layer includes:
a collector configured to dynamically collect a workload value being a function of at least one of a performance metric, a reliability metric, an extra factor, and a data distribution ratio on the each of the plurality of computer nodes;
a job informer configured to determine respective types of known and unknown jobs on the each of the plurality of computer nodes;
a job optimizer configured to determine a data distribution vector based on the workload value and the respective types of the known and unknown jobs on each of the computer nodes, the data distribution vector defining a respective amount of the data load to be distributed among the plurality of computer nodes to perform the at least one job;
a lookup table configured to store the data distribution vector; and
a lookup table manager configured to maintain the lookup table and provide a query interface to the application injector,
wherein the application injector is further configured to send a query for a task identifier of the at least one job to the lookup table manager through the query interface, receive the data distribution vector from the lookup table manger through the query interface, and schedule the at least one job based on, the data distribution vector,
wherein the application injector is further configured tow receive a request for a critical task with a critical time for completing the critical task, and transmit the request for the critical task request to the query interface,
wherein the query interface is configured to reply an expected time for the critical task to the application injector.

7. The distributed heterogeneous computer system of claim 6, wherein the application injector is further configured to:
determine the critical time is less than the expected time;
reject task launch for the critical task when the critical time is less than the expected time; and
accept the task launch for the critical task when the critical time is not less than the expected time.

* * * * *